US012126956B2

(12) United States Patent
Christensen et al.

(10) Patent No.: US 12,126,956 B2
(45) Date of Patent: Oct. 22, 2024

(54) HEARING DEVICE COMPRISING A CONTROLLABLE VALVE DEVICE AND A METHOD FOR CONTROLLING THE VALVE DEVICE

(71) Applicant: GN Hearing A/S, Ballerup (DK)

(72) Inventors: Henrik Christensen, Ballerup (DK); Ulrik Mehr, Ballerup (DK); Anders Bøje Nielsen, Ballerup (DK); Thomas Olsgaard, Ballerup (DK); Michael Skovdal-Olsen, Ballerup (DK)

(73) Assignee: GN Hearing A/S, Ballerup (DK)

( * ) Notice: Subject to any disclaimer, the term of this patent is extended or adjusted under 35 U.S.C. 154(b) by 154 days.

(21) Appl. No.: 17/740,286

(22) Filed: May 9, 2022

(65) Prior Publication Data

US 2023/0007384 A1 Jan. 5, 2023

(30) Foreign Application Priority Data

Jul. 1, 2021 (EP) .................................... 21183054

(51) Int. Cl.
*H04R 1/10* (2006.01)

(52) U.S. Cl.
CPC ......... *H04R 1/1075* (2013.01); *H04R 1/1016* (2013.01); *H04R 2460/11* (2013.01)

(58) Field of Classification Search
CPC ................ H04R 1/1075; H04R 1/1016; H04R 2460/11; H04R 2225/61; H04R 1/1041;
(Continued)

(56) References Cited

U.S. PATENT DOCUMENTS 6,549,635 B1 * 4/2003 Gebert ................ H04R 25/652 381/322
2014/0169603 A1 * 6/2014 Sacha ................ H04R 25/652 381/324

(Continued)

FOREIGN PATENT DOCUMENTS

EP 0 684 750 A2 11/1995
EP 0 684 750 A3 11/1995

(Continued)

OTHER PUBLICATIONS

Extended European Search Report for EP Patent Appln. No. 21183054.2 dated Dec. 23, 2021.

(Continued)

*Primary Examiner* — Angelica M McKinney
(74) *Attorney, Agent, or Firm* — Vista IP Law Group, LLP

(57) ABSTRACT

The disclosure relates to a hearing device comprising a receiver module for insertion into an ear canal of a user of the hearing device, the receiver module comprising a signal processor, an output transducer, and a vent having a valve device, the valve device comprising at least one stationary valve coil, a movable magnet, and a movable valve element, the valve element being configured to open and close the vent, wherein the signal processor is configured to determine a current position of the valve element in the vent, and wherein the signal processor is configured to apply a drive signal to the valve coil to thereby move the valve element from the current position to a desired position. The disclosure further relates to a method for controlling a valve device of a hearing device and a binaural system.

15 Claims, 4 Drawing Sheets

(58) Field of Classification Search

CPC ...... H04R 25/30; H04R 25/45; H04R 25/453; H04R 25/603; H04R 25/456; H04R 25/652; H01F 7/064

See application file for complete search history.

(56) References Cited

U.S. PATENT DOCUMENTS

| | | | | |
|---|---|---|---|---|
| 2016/0255433 A1* | 9/2016 | Grinker | H04R 1/1016 381/380 |
| 2018/0091892 A1* | 3/2018 | Taylor | H04R 1/2826 |
| 2018/0160213 A1* | 6/2018 | Grinker | H04R 1/1083 |
| 2019/0116437 A1* | 4/2019 | Bolsman | H04R 11/02 |
| 2019/0246219 A1* | 8/2019 | Lafort | H01F 7/064 |
| 2020/0196044 A1* | 6/2020 | Tiefenau | H04R 25/456 |

FOREIGN PATENT DOCUMENTS

| | | | |
|---|---|---|---|
| EP | 2835987 | 2/2015 | |
| EP | 2835987 A1 * | 2/2015 | H04R 25/456 |
| EP | 3471432 A1 * | 4/2019 | H04R 1/1041 |
| EP | 3567873 | 11/2019 | |
| EP | 3668117 | 6/2020 | |
| EP | 3668118 | 6/2020 | |
| EP | 3675524 | 7/2020 | |
| EP | 3799443 | 3/2021 | |
| WO | WO 2019/052715 | 3/2019 | |

OTHER PUBLICATIONS

Examination report for Danish patent application No. PA 2021 70347 dated Dec. 16, 2021.

Extended European Search Report dated Jun. 25, 2019 for corresponding European Application No. 18212535.1.

Extended European Search Report dated Jun. 25, 2019 for related European Application No. 18212555.9.

Notice of Allowance for U.S. Appl. No. 16/690,085 dated Jun. 10, 2020.

Non-Final Office Action for U.S. Appl. No. 16/949,087 dated Jul. 30, 2021.

Notice of Allowance for U.S. Appl. No. 16/949,087 dated Jan. 18, 2022.

* cited by examiner

HEARING DEVICE COMPRISING A CONTROLLABLE VALVE DEVICE AND A METHOD FOR CONTROLLING THE VALVE DEVICE

RELATED APPLICATION DATA

This application claims priority to, and the benefit of, European Patent Application No. 21183054.2 filed on Jul. 1, 2021. The entire disclosure of the above application is expressly incorporated by reference herein.

FIELD

The present disclosure relates to hearing devices. More specifically, the disclosure relates to a hearing device comprising a vent having a vent device configured to open and close the vent. The present disclosure further relates to a method for controlling the valve device.

BACKGROUND

A hearing device is an electronic device adapted for providing sound to, or alleviating a hearing loss of a person. There are different types of hearing devices. One common type of hearing devices are behind-the-ear (BTE) hearing devices which typically have a plug connector comprising an in-the-ear unit to be inserted into an ear canal of a user. The in-the-ear unit is, in some implementations, addressed as a receiver-in-the-canal (RIC), and also known as a receiver-in-the-ear (RITE). Another type of hearing devices are in-the-ear (ITE) hearing devices which comprises an in-the-ear unit, configured to be inserted into an ear canal of a user. The in-the-ear unit typically comprises a speaker which amplifies sounds received by microphones of the hearing device into the ear canal of the user. The in-the-ear unit typically comprises a vent formed as a through-going opening that may be opened and closed by a valve. In this way, occlusion effect can be prevented.

However, such vent in the in-the-ear unit may become clogged by, e.g., cerumen and skin particles falling off from the ear canal. Such clogging may affect the functionality of the hearing device and hence the lifetime of the hearing device. Also, the clogging may prevent the vent from being fully open or fully closed by the valve, and a processor of the hearing device may not be able to detect where the valve is and that the valve cannot open or close the vent. Furthermore, opening and closing the vent by the valve is often accompanied by a loud sound which is generated by the valve reaching a closing/opening position. This sound is undesired, as it may be generated often and therefore disturb the hearing device user. Therefore, there is a need for an improved hearing device that addresses the abovementioned problems.

SUMMARY

It is an object to provide an improved hearing device. It is an object of the present disclosure to mitigate, alleviate or eliminate one or more of the above-identified deficiencies and disadvantages in the prior art and solve at least the above mentioned problems.

In particular, it is an object to provide a hearing device with a vent and a controllable valve device.

It is also an object to provide a hearing device in which a position of a valve device in a vent is known.

It is yet a further object to provide a silent hearing device which does not provide any clicking sound when a vent is opened or closed by a valve device.

It is yet another object to allow for monitoring functionality of a valve device of a hearing device.

According to a first aspect, there is provided a hearing device comprising a receiver module configured to be at least partly inserted into an ear canal of a user of the hearing device. The receiver module comprises a signal processor, an output transducer, and a vent. The vent has a valve device. The valve device comprises at least one stationary valve coil, a movable magnet, and a movable valve element. The valve element is be configured to open and close the vent. The signal processor is configured to determine a current position of the valve element in the vent. The signal processor is configured to apply a drive signal to the valve coil to thereby move the valve element from the current position to a desired position.

The hearing device may be a headset, a hearing aid, a hearable etc. The hearing device may be an in-the-ear (ITE) hearing device, a receiver-in-ear (RIE) hearing device, a receiver-in-canal (RIC) hearing device, a microphone-and-receiver-in-ear (MaRIE) hearing device, a behind-the-ear (BTE) hearing device, an over-the-counter (OTC) hearing device, a one-size-fits-all hearing device, etc. The hearing device is configured to be worn by a user. The hearing device may be arranged at the user's ear, on the user's ear, in the user's ear, in the user's ear canal, behind the user's ear etc. The user may wear two hearing devices, one hearing device at each ear. The two hearing devices may be connected, such as wirelessly connected. The hearing device may be configured for audio communication, e.g. enabling the user to listen to media, such as music or radio, and/or enabling the user to perform phone calls. The hearing device may be configured for performing hearing compensation for the user. The hearing device may be configured for performing noise cancellation etc. The hearing device may comprise a RIE unit. The RIE unit typically comprises the earpiece such as a housing, a plug connector, and an electrical wire/tube connecting the plug connector and earpiece. The earpiece comprises the receiver module configured for being provided into an ear canal of a user, and an open or closed dome. The dome may support correct placement of the earpiece in the ear of the user. The RIE unit may comprise a microphone, a receiver, one or more sensors, and/or other electronics. Some electronic components may be placed in the earpiece, while other electronic components may be placed in the plug connector. The receiver may be with a different strength, i.e. low power, medium power, or high power. The electrical wire/tube provides an electrical connection between electronic components provided in the earpiece of the RIE unit and electronic components provided in the BTE unit. The electrical wire/tube as well as the RIE unit itself may have different lengths.

The receiver module is configured to be at least partly inserted into the hearing device user's ear canal. The receiver module may comprise a receiver housing. The receiver module may be connected to the hearing device via, e.g., a receiver wire. The receiver wire may be arranged at one end of the receiver housing. The receiver module may comprise a receiver sound outlet tube. The receiver module may be connected to one end of the receiver sound outlet tube at another end of the receiver housing. The other end of the receiver sound outlet tube may be held in place by a vent outlet.

The hearing device may comprise output transducer, also referred to as a receiver or speaker or loudspeaker. The receiver may be connected to an output of the signal processor. The receiver may output the modified signal into the user's ear. The receiver, or a digital-to-analogue converter, may convert the modified signal, which is a digital signal, from the processor to an analogue signal. The receiver may be comprised in an ITE unit or in an earpiece, e.g. RIE unit or MaRIE unit.

By the vent is hereby meant an elongated compartment comprising a valve device. The vent may be formed as a through-going canal in the body of the hearing device i.e. in the body of the receiver module of the hearing device. The vent may provide the hearing device with an acoustic path from the outside of the hearing device to the part residing within the ear canal of the user during use e.g. the receiver module. The vent may have one or more of vent openings. The vent openings may be embodied as a ring or inner bushel restricting the inner diameter of a proximal end of the receiver housing. A flange may be arranged at one end of the receiver housing. The flange may provide sealing between an ear plug and the receiver housing when the receiver housing is mounted in the ear plug.

In the present context, the valve device is to be interpreted as a controllable acoustic valve of the hearing device dimensioned such that it can fit inside the ITE unit, and typically inside the vent of the hearing device. The valve device may be a micro-acoustic valve. The valve device may be positioned in a valve seat.

The valve device may comprise at least one stationary valve coil, a movable magnet, and a movable valve element. The valve coil may be a solenoid coil. The valve coil may be a drive coil with windings. The movable magnet may be a permanent magnet. The magnet may be a toroidal magnet. The valve element and the magnet may be mounted together on the receiver sound outlet tube in a way that facilitates a sliding/moving motion of the valve device along the vent, e.g. between an open position and a closed position. The valve device may comprise two coils and two magnets arranged opposite to each other in the vent channel or in the valve seat. A first coil may control the movement of a first magnet, and a second coil may control the movements of a second magnet. The pair coil-magnet may control the movement of the valve element.

The valve element may be configured to follow the movements of the magnet. The valve element may also be mechanically attached to the magnet. The valve element may be configured to be maintained in a desired position by retention force, such as a magnetic force, a resilient force, etc. existing between the movable magnet and the valve element. For instance, the valve element may move linearly or rotationally along a first direction inside a chamber of the vent until it hits a boundary at the end of the vent or at the end of the valve seat.

The valve element may be configured to open and close the vent by being in an open position and in a closed position, respectively. By the valve element is hereby meant a movable component of the valve device which is configured to open and close the vent. The valve element allows for pressure equalization between the ear canal and the surroundings. When the valve element opens the vent, there may be no occlusion and the user may hear sounds from the surroundings, so-called open fit. When the valve element closes the vent, there may be occlusion and the user may not hear sounds from the surroundings, so-called closed fit. The closed fit is desired e.g. when the user listens music or when the user has a phone call via an associated electronic device, e.g. a smart phone. The open fit or the closed fit may be selected by the user via an electronic device associated with the hearing device when desired.

For example, in the open position of the valve device, the coil may attract the magnet towards one end of the receiver housing. The open position may provide a passageway for air to flow between the vent openings and a vent outlet. When the ear plug and the receiver housing is mounted in its intended place in the ear canal, the passageway may be the only way air can escape the ear canal, in the case that there is a sealing between the ear plug and the receiver housing.

In another example, in the closed position of the valve device, the coil may repel the permanent magnet towards another end of the receiver housing. The closed position may provide no passageway for air to flow between the vent openings and the vent outlet i.e. the passageway may be closed. For instance, when an edge of the valve device abuts a rim of the vent outlet, the valve device and the vent outlet may form a seal trapping the air in the ear canal from the exterior.

The signal processor may be a microprocessor placed in the RIE unit of the hearing device. The signal processor is typically responsible for signal processing and controlling of various parts in the hearing device. One or more microphone output signals may be provided to the signal processor for processing the one or more microphone output signals. The signals may be processed such as to compensate for a user's hearing loss or hearing impairment. The signal processor may provide a modified signal. All these components may be comprised in a housing of an ITE unit or a BTE unit. The hearing device signal processor may comprise elements such as an amplifier, a compressor and/or a noise reduction system etc. The signal processor may be implemented in a signal-processing chip or a printed circuit board (PCB). The hearing device may further have a filter function, such as compensation filter for optimizing the output signal.

The signal processor may partly be located in the BTE unit and partly in the ITE unit. The signal processor may comprise a controller or a microprocessor, i.e. the part located in the ITE unit and which is typically responsible for controlling the valve device. By the controller/microprocessor is hereby meant a valve device controller, configured to control the valve device by applying the drive signal. The terms signal processor and controller and microprocessor may be used interchangeably.

The signal processor may be configured to determine a current position of the valve element in the vent or in the valve seat. The current position may be determined while the valve element is stationary or while the valve element is moving towards the desired position. The current position may be determined in various ways based on e.g. speed of the valve element, if the valve element is in motion, based on a magnetic field between the coil and the magnet, based on inductance of the coil, based on a current in the coil, or similar. Additionally, the current position may be calculated by a machine learning algorithm or an artificial intelligence which could use speed, current, inductance and/or magnetic field data obtained in previous measurements as input data in addition to a total operational time since the first use. The total operational time may indicate how much the ear wax could have been accumulated in the vent. The machine learning algorithm could also use logged data such as the inductance or current in order to improve the accuracy of position determination. Typically, the current position is determined by the signal processor receiving a feedback from the valve device, in particular from the coil, or from the magnet, or from both. It is desired to determine the current position of the valve element in order to know how to drive the coil to thereby move the valve element from the current position to the desired position. Once the position is determined, the signal processor may determine the drive signal, i.e. its polarity, amplitude, phase, frequency, etc., in order to appropriately move the valve element in a desired direction and to the desired position. The signal processor may continuously measure the position of the valve element as it travels along the vent or valve seat. If the current position is unknown, the signal processor may apply a drive signal which may not cause the valve element to arrive to the desired position. Such scenarios may in particular happen when the vent is clogged or the valve device is not functioning properly.

The signal processor may be configured to apply a drive signal to the valve coil to thereby move the valve element from the current position to a desired position. The drive signal may be based on the determined current position. The drive signal may be based on the current position and the desired position. The sliding/moving motion of the valve element may be initiated by applying the drive signal to the valve coil for creating a magnetic field attracting or repelling the magnet. The drive signal through the valve coil in one direction may attract the magnet, thereby opening the vent, and drive signal in the opposite direction through the valve coil may repel the magnet, thereby closing the vent. The desired position may be an end position, i.e. the opened position or the closed position, or any other position of the valve element along the vent or along the valve seat. The open position of the valve is where the vent is open. The closed position of the valve is when the vent is closed. The desired position may be somewhere along the vent or along the valve seat in scenarios when it is desired to open/close the vent slowly, such that the vent is, e.g. 30% open for, e.g., 3 seconds or more. Afterwards, the processor may take one or more further steps to move the valve element closer to the end position before it is fully open/closed. This may be performed in situations when an internal feedback system needs to provide a feedback evaluation. When the vent is fully open the internal feedback system may be allowed to react and warn of possible risk of feedback.

If the microprocessor determines that the valve element is close to the desired position, e.g. the closed position, the applied drive signal may be smaller compared to a scenario when the valve element should be moved from, e.g. the open position to the closed position. If the current position is the desired position the microprocessor will set the drive signal to zero. For instance, if the valve element is at the closed position and this position is determined by the signal processor, repetitive requests for moving the valve element to the closed position are avoided. In old systems, where the position of the valve device is not known, the signal processor may apply current to move the valve element and in that way unnecessarily consume battery power.

As stated above, the position may be determined continuously and the drive signal may be recalculated based on the position change. In some embodiments, after applying the drive signal for a predetermined time span, e.g. 1 ms, the vent element is expected to move and take a first intermediate position. If the current position is not changed upon applying the drive signal to the first intermediate position, it may mean that the vent is clogged or the valve device does not function properly. It may also mean that the force applied by the vent valve device has not been able to move and push the potential obstacles from the vent. The signal processor may then, based on the actual position determine another drive signal which may be able to push the obstacles. If eventually, the valve element reached the desired position, the signal processor may identify the problem based on the drive signals applied and time needed to reach the desired position. In cases that the drive signal does not move the valve element, the vent may be clogged. The signal processor may then send a notification to the user. Thereby, the user may e.g. clean the receiver module or may run a checkup control, service, adjustment, refitting or diagnose.

By having a hearing device which signal processor is configured to determine the position of the valve element and to further drive the valve device accordingly to thereby reach the desired position, it is possible to ensure proper functioning of the valve device and also to detect possible clogging of the vent or the valve seat. Furthermore, by determining the current position of the valve element it is possible to ensure that the valve is fully closed or fully open, and thereby provide desired effect, i.e. open fit or closed fit of the hearing device. Also, unnecessary drive signals are avoided if the current position is the desired position, thereby saving battery power.

According to some embodiments, the drive signal is an electric current or voltage. The current may be a direct current or an alternating current. The voltage may be a constant voltage or a time-varying voltage. It may be in the form of pulses varying in frequency, phase, amplitude, and time. The voltage may be generated by a voltage source which is in turn controlled by the signal processor. The supply voltage or supply current may be applied to a driver circuit of the coil.

According to some embodiments, the signal processor is configured to determine an inductance of the valve coil to thereby derive the position of the valve element in the vent. The inductance can be determined for all valve element positions including the open and closed position. Typically, the inductance will be higher for positions closer to the open position than to the closed position, as the magnet and the coil are closer to each other. However, in some configurations, when placement of the coil is different, i.e. when the coil is closer to the closed position, it may be that the inductance is higher for positions closer to the closed position than to the closed position. The inductance of the coil, or the inductance between the magnet and the coil can be determined from a frequency that the signal processor can measure. The coil may be a part of an LC circuit, and the inductance (L) of the circuit may be determined from a resonant frequency of the LC circuit. Therefore, the inductance of the coil may depend on the resonant frequency of the LC circuit comprising the valve coil. The signal processor, i.e. the microprocessor may choose another way to measure inductance, i.e. the microprocessor may measure other parameters related to the inductive coupling between the magnet and the coil and derive the inductance therefrom. The inductance of the coil is different for different positions of the magnet, and thereby the valve element, as the inductive coupling between the coil and magnet changes as the magnet moves. Normally, the position of the valve element is closely related to the position of the magnet. The inductance is a parameter which can be calculated in a simple and versatile way and thereby advantageous.

According to some embodiments, the signal processor is configured to determine the position of the valve element in the vent by measuring a change of a current in the coil. According to this embodiment, the signal processor may start a timer when the drive signal is initiated. The drive signal may be modulated by PWM. When the current in the coil is exceeding a threshold, the timer is stopped. The time for a closed and open valve may be different because the inductance of the coil is different depending on the position of the magnet. The position is then determined from the current difference at the two recorded times and the time span during the change occurred.

According to some embodiments, the signal processor is configured to determine a valve element speed while the valve element is moving in the vent. The speed may be determined by a frequent position determination. Namely, the valve speed may simply be determined by determining two consecutive positions and a time period required for the valve element to pass this distance. When the signal processor determines the current position a timer may be initiated. The processor may then again determine the valve element position and the time. Based on these data, the speed can be derived. Slow valve element speed or scenarios when the valve element is not reaching an end position can indicate clogging of the vent by, e.g., ear wax. In these scenarios, the signal processor may send a message to the user to clean or replace the ITE unit.

It is beneficial to determine the speed of the valve element in particular in cases when the speed does not correspond to the applied drive signal. When the speed does not correspond to the applied drive signal, a problem with the valve device or vent may exist. If the hearing device, and in particular the signal processor cannot solve the problem automatically, the hearing device may notify the user about the problem. The problem may be a clogged vent, a malfunctioning of the valve device, etc. The notification may be any type of notification. For instance, the notification may be a text message or an audio signal shown on an application of the associated electronic device.

According to some embodiments, the signal processor is configured to change a valve element speed by applying a modulation on the drive signal applied to the valve coil. By modulating the drive signal the valve element can be accelerated as well as decelerated. Typically, if the signal processor determines that the vent is partly clogged or there is an obstacle in the vent, the drive signal may be modulated such that the speed is increased. If the signal processor determines that the valve element is near the end position, the drive signal may be modulated such that the speed of the valve element is at first decreased and then, more force is applied by the drive signal once the valve element is at the end position. Such modulation is applied to ensure noiseless and secure open/close of the vent. When the drive signal is modulated, the attraction force existing between the magnet and coil is changed and thereby the speed of the valve element. The drive signal may for instance be reversed and the attraction force will follow.

According to some embodiments, the applied modulation is a pulse width modulation (PWM), or amplitude modulation (AM), or on-off keying (OOK) modulation. The valve element speed can actively be controlled by applying PWM onto the drive signal. In one example, when the valve element is to be moved from an open position to the closed position, in the beginning of the valve element movement, the PWM may be set to 100% to give the highest acceleration, then the PWM may be decreased to, e.g., 20% or even reverse polarity of the drive signal to decrease the speed of the valve element movement, and at the end of the movement, the PWM may be increased back to 100% to make sure the valve element is moved to the desired position. If the initial acceleration is maintained by the end of the movement, i.e. until the vent is closed, the loud click sound will be generated. This is then solved by decelerating the valve element. However, slow movement of the valve element at the closed position may cause displacement of the valve element from the valve seat. This is then solved by adding force to the valve element again to ensure proper close and avoid any possible misplacement of the valve element.

According to some embodiments, the signal processor is configured to change a valve element speed. In one embodiment, when the valve element is close to the desired position, in particular when the valve element is close to an end position, i.e. the open position or the closed position, the valve element speed may be reduced. When the valve element enters/arrives in the first position a click sound may be produced. Namely, when entering the end position, the valve element may hit a boundary, thereby producing the click sound. Hence, the click sound is produced due to a physical collision between the valve element and the boundary. The boundary may be arranged inside a chamber of the vent at its ends. For example, the click sound may be produced when an edge of the valve element abuts a rim of the vent outlet. A sound level pressure of the click sound may be in the range of 19-110 dB. However, any movements in the hearing device, including the movement of the valve element is preferably as silent as possible in order not to disturb sounds intended to be heard by the user. Therefore, it is desired to neutralize, reduce, or avoid generation of the click sound, i.e. ensure soft closing/opening of the vent to thereby minimize closing/opening noise. One or more embodiments described herein solve the problem by reducing the valve element speed when the valve element is close to the end position. The valve speed may be reduced by reducing the drive signal applied to the coil and/or by modulating the drive signal thereby reducing acceleration of the valve element. The drive signal may be reversed, i.e. its polarity may be changed thereby changing the force towards the magnet and thereby decelerating the valve element. When valve element is at, or substantially at the end position, the coil drive, and thereby the force produced on the magnet, may be increased in order to ensure a proper seal and tight close, or secure opened position. By changing, i.e. decreasing the valve element speed near the end position a soft noiseless close/opening is ensured. By increasing the valve element speed at the end position a proper seal and tight close is ensured.

In another embodiment, when the signal processor detects that the position of the valve element does not change in accordance to the applied drive signal, and in particular when the change in the position is smaller than expected, the valve element speed may be increased. The signal processor may be configured to determine a position of the valve element based on an initial position and the drive signal applied to the coil. If the valve device does not reach the desired position when expected, it may be an indication that something prevents the valve element from moving in accordance with the drive signal. It may be an indication of clogging of the vent, or a sign of an improper functioning of the valve device. To solve the issue, the drive signal may be modulated to thereby speed up the valve element by applying larger force onto the magnet. If a further increase does not move the valve element forward the signal processor may send a command to the associated electronic device running an app which then notifies the user of the issue.

According to some embodiments, the signal processor is configured to determine a voltage generated by the movable magnet relative to the valve coil. The signal processor may determine the valve element speed based on the determined generated voltage. The voltage generated by a fast moving magnet can be used as an indication of the valve speed. The position of the valve element may be estimated on the basis of the generated voltage and an initial position. The advantage of detecting the voltage is that it is a very simple measurement clearly indicating a movement of the magnet and thus valve element. Knowing the max generated voltage could also be an indicator of wear of the valve device or blockage of the vent.

According to some embodiments, the signal processor is configured to determine a minimum drive signal required to move the valve element from the current position to the desired position. The minimum drive signal may be determined based on the distance between the current and the desired position. Typically, the shorter the distance the lower the drive signal is. By determining minimum drive signal, less power is consumed and thereby battery lifetime maximized. The minimum drive signal may be determined during hearing device testing, by applying different drive signals to move the valve element between two predetermined positions and selecting the minimal one able to move the valve element accordingly.

According to some embodiments, the drive signal is based on the determined current position of the valve element in the vent. The signal processor may calculate the drive signal after knowing the current position. The current position may be the desired position and in that case, there is no need to drive the coil and the drive signal is then set to zero. Also in other scenarios, the current position may be one of the key factors in determining the drive signal.

According to some embodiments, the hearing device may comprise one or more input transducers. The input transducer may be an external input transducer e.g. a microphone for picking up acoustic signals from the surroundings and converting the acoustic signals into electrical signals. The picked up acoustic signals may be analogue signals. The input transducer may be connected to an analog to digital (A/D) converter for converting the electrical signals from first input transducer into digital signals. All the signals may be sound signals or signals comprising information about sound. The hearing device may comprise more than one input transducer such as an internal input transducer. The internal input transducer may be arranged inside the receiver module of the hearing device. In some embodiments, at least one of the one or more input transducers may be arranged in the hearing device. Thereby, a more compact hearing device may be provided. For instance, the first input transducers of the hearing device which are compatible with the conventional design may be used as the one or more input transducers.

According to some embodiments, at least one of the one or more input transducers may be arranged in the receiver module of the hearing device. Thereby, at least one of the one or more input transducers may be arranged closer to the valve device, allowing for e.g. a more sensitive hearing device. For example, at least one of the one or more input transducers may be arranged in front of the receiver module i.e. pointing towards the ear canal of the user when the user of the hearing device wears it in its intended position. Another example, at least one of the one or more input transducers may be arranged opposite to the receiver module i.e. pointing away from the ear canal of the user when the user of the hearing device wears it in its intended position. Thereby, at least one of the one or more input transducers may be arranged in flexible manner e.g. allowing for an improved design flexibility. The one or more input transducers may be vibration sensors e.g. a bone conducting sensor. The one or more input transducers may be part of the hearing device and may provide supplementary input signal to improve the overall signal-to-noise ratio (SNR).

According to some embodiments, the hearing device further comprises a wireless communication unit and an antenna. The wireless communication unit, i.e. a wireless communication circuit or a magnetic induction chip, for wireless data communication is typically interconnected with the antenna, such as a radio-frequency (RF) antenna or a magnetic induction antenna, for emission and reception of an electromagnetic field. The wireless communication unit including a radio or a transceiver, may connect to the hearing device signal processor and the antenna, for communicating with one or more external devices, such as one or more external electronic devices, including at least one smart phone, at least one tablet, at least one hearing accessory device, including at least one spouse microphone, remote control, audio testing device, etc., or, in some embodiments, with another hearing device, such as another hearing device located at another ear, typically in a binaural hearing device system.

According to some embodiments, the one or more input transducers comprises a microphone or an array of microphones. The microphone or the array of the microphones may be any type of microphones compatible with the hearing devices. The microphone or the array of the microphones may be any type conventional and commercially available microphones, compatible with the hearing devices.

According to some embodiments, the signal processor is configured to electrically drive the valve coil at scheduled times. Thereby a more convenient and user-friendly hearing device may be provided. The scheduled times may be determined by the user of the hearing device. For instance, the user may schedule the valve device control in accordance to his/her day.

According to some embodiments, the controller may be configured to apply a stronger drive signal to the valve device in order to apply a higher force to move potential obstacles in the vent. By the stronger drive signal, it is hereby meant a signal which may be 25% to 200% higher than the originally calculated drive signal. This may in turn allow for more force i.e. higher force may be applied to the valve device. Thereby, the valve device may push and move away debris, and foreign objects e.g. cerumen or skin particles from the vent that may otherwise not be removed by the reference current. This may in turn facilitate the self-cleaning motion and may hence further increase the lifetime of the receiver module of the hearing device. Such potential obstacles may be moved away from the vent e.g. towards an outlet of the receiver module. The receiver module may comprise vent holes on its circumference. In this case, the potential obstacles may be moved out of the vent module via the vent holes on the circumference of the vent module. In any case, such potential obstacles may be captured by a dome geometry of the hearing device i.e. in a dome of the hearing device, and may be removed when the dome is exchanged or cleaned. When, after another determination of a current position, it is determined that the valve element is not moving as it should in accordance to the applied drive signal, the controller may recalculate the drive signal or may check other parameters related to the vent and/or valve device.

In some embodiments, the valve device operation may be tested and thereby optimized. The optimization may be performed by altering the valve element between the open and closed position while gradually lowering the drive signal to the coil after each position cycle. The valve element may eventually result in either open or closed position not being obtained in such test of the valve device functionality. The drive signal value of the last operational close or open cycle would indicate the drive value with the minimum amount of energy required to change to that position. The minimum energy required to open may not be the same as the minimum energy required for the close. This valve test can be performed when the hearing device is, e.g., placed in a charger and/or via an associated electronic device and its user interface via the hearing device app. The test can be used for optimization of energy used to open and close the valve in order to save power, for minimization of click-sounds when using minimal energy to re-position the valve, and/or for elevated or suddenly increased minimum energy values which may indicate wear or blockage of the valve function by. i.e. ear wax, lack of lubrication where needed or other. The valve test can also be a part of the regular operation of the valve device if, e.g., the time used to change position is seen to increase over the usage of the hearing device.

According to a second aspect there is provided a method for controlling a valve device of a hearing device, the hearing device comprising a receiver module for insertion into an ear canal of a hearing device user, the receiver module comprising a signal processor, an output transducer, a vent having the valve device, the valve device comprising at least one stationary valve coil, a movable magnet, and a movable valve element, the valve element being configured to open and close the vent. The method comprises:

- determining, by the signal processor, a current position of the valve element in the vent, and
- applying, by the signal processor, a drive signal to the valve coil to thereby move the valve element from the current position to a desired position.

The drive signal may be calculated on the basis of the determined current position, or additionally on the basis of the desired position. Depending on the distance between the current and desired position the signal processor may calculate the minimum power to be used for the drive signal to ensure that the valve element reaches the desired position, thereby saving battery power.

According to some embodiments, the method comprises modulating the drive signal to thereby change a valve element speed before it reaches an end position, the end position being an open position or a closed position. The drive signal may be modulated before the valve element reached the desired position. By doing so, a soft close/opening is ensured thereby minimizing the clicking noise associated with the closing/opening of the vent.

According to some embodiments, the method comprises determining the position of the valve element at least one more time before the valve element reaches the desired position. The position is determined at least one more time in order to know when to modulate the drive signal. When the determined position is close to the desired position, such as at 90% of the distance between the current and the desired position, the drive signal is modulated in order to ensure silent and proper operation of the vent device. It is beneficial to determine the position at least one more time prior to reaching the desired position in order to ensure silent and proper operation of the vent device. By proper functioning is meant that the valve device has the speed in accordance to the drive signal.

According to a third aspect there is provided a binaural system comprising a first hearing device and a second hearing device. The first and second hearing devices may comprise features described above in connection with the first aspect of some of the embodiments. The first sound and/or the second sound of the first or the second hearing device are detectable by the one or more input transducers in sequence with respect to one another. This aspect may generally present the same or corresponding advantages as the first aspect. In the binaural system, the first hearing device may be used in relation to one ear and the second hearing device is used in relation to another ear. In addition, the first sound and/or the second sound of the first or the second hearing device may be detectable by the one or more input transducers in sequence with respect to one another. In other words, the one or more input transducers of the binaural system may detect the first and/or the second sound of the first or the second hearing device one after the one e.g. in a consecutive manner. Thereby, the first sound and/or the second sound of the first or the second hearing device may be detected in a reliable manner and hence an improved binaural system is provided.

The present disclosure relates to different aspects including the device, method and the system described above and in the following, and corresponding device parts, each yielding one or more of the benefits and advantages described in connection with the first mentioned aspect, and each having one or more embodiments corresponding to the embodiments described in connection with the first mentioned aspect and/or disclosed in the appended claims. Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

Figure 1:
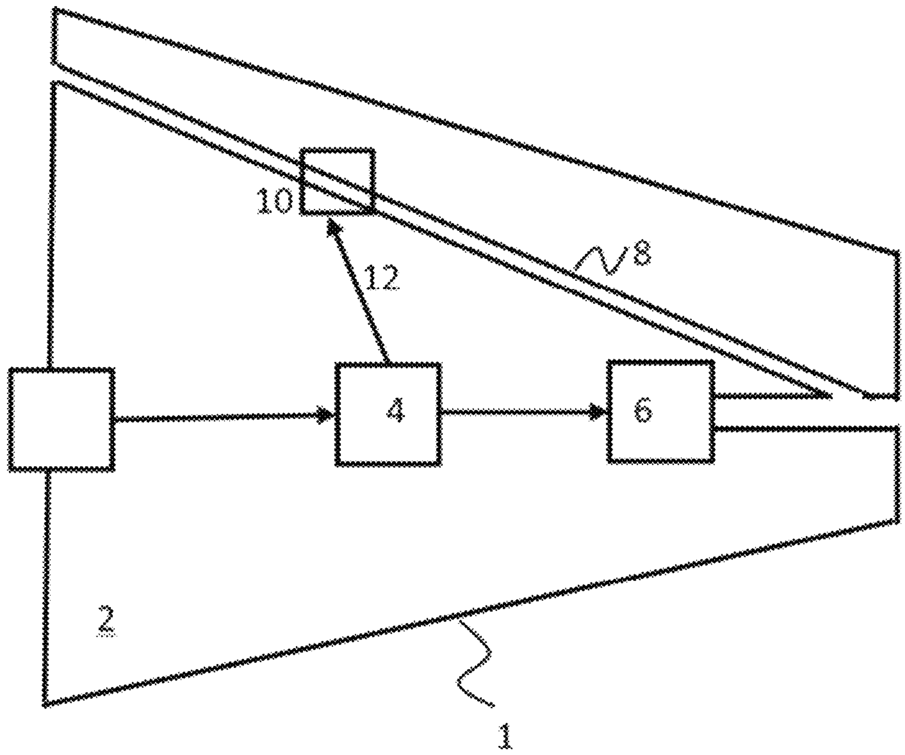
FIG. 1 schematically illustrates an exemplary block schematic of a hearing device comprising a receiver module with a valve device.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 schematically illustrates an exemplary block schematic of a hearing device 1 comprising a receiver module 2. The hearing device 1 shown in FIG. 1 is in the form of an in-the-ear (ITE) hearing device 1. During use, the ITE hearing device 1 is at least partly placed in an ear canal of a user and is held in place partly by the shape of part of a user's outer ear and partly by the shape of the ear canal itself. FIG. 1 shows that the hearing device 1 comprises a receiver module 2 for insertion into the ear canal of the user of the hearing device 1.

FIG. 1 shows that the hearing device 1 comprises the receiver module 2 comprising a signal processor 4, an output transducer 10, and a vent 8 having a valve device 6. The valve device 10 comprises at least one stationary valve coil, a movable magnet, and a movable valve element (not shown). The valve device 10, or more precisely the valve element, is configured to open and close the vent 8. The signal processor 4 is configured to determine a current position of the valve element in the vent 8 and apply a drive signal 12 to the valve coil to thereby move the valve element from the current position to a desired position.

Figure 2:
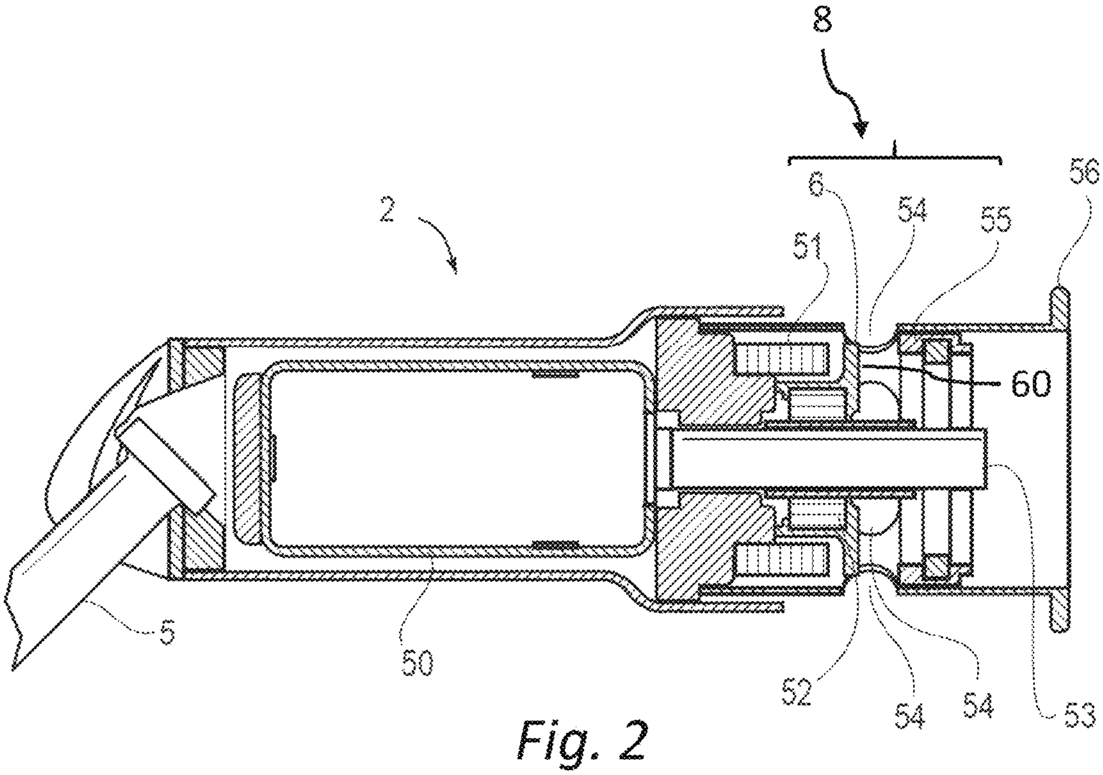
FIG. 2 schematically illustrates a longitudinal cut through a receiver module of a hearing device having a vent in an open position.
Figure 3:
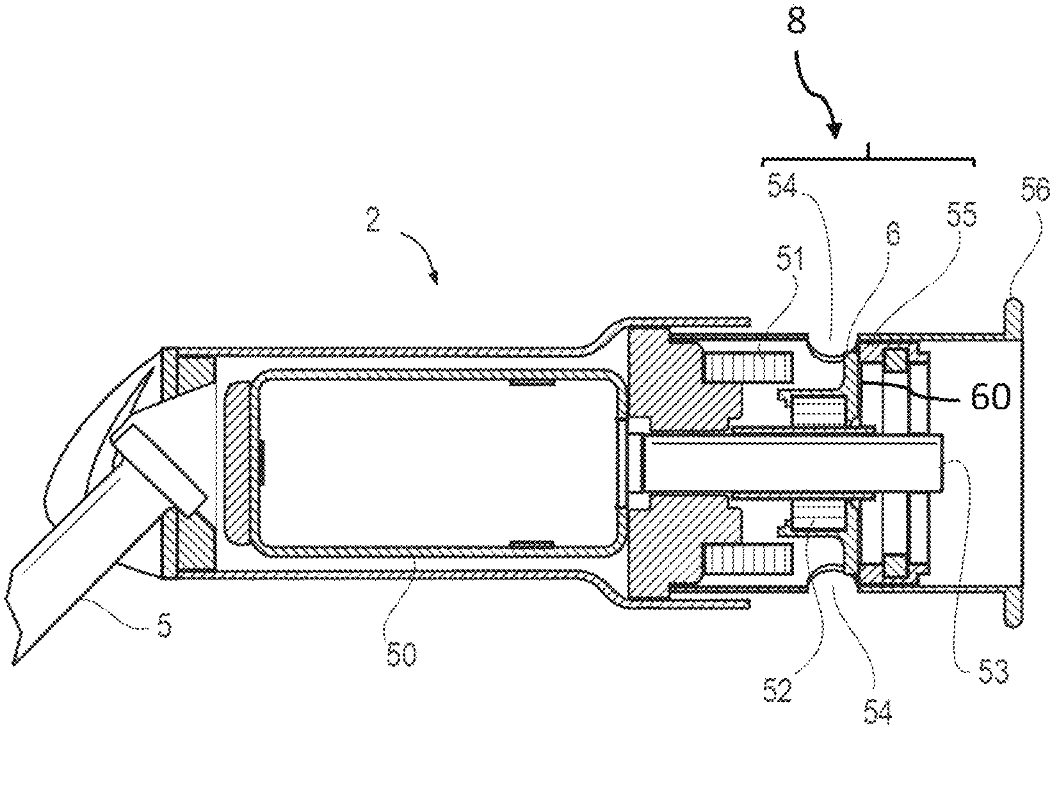
FIG. 3 schematically illustrates a longitudinal cut through the receiver module of the hearing device, shown in FIG. 2, having a vent in a closed position.

FIGS. 2 and 3 schematically illustrate a longitudinal cross-section through a receiver module 2 of a hearing device 1 having a vent 8 in an open position and a closed position, respectively. The receiver module 2 comprises an output transducer 3, a vent 8 having a valve device 6. The vent 8, as also shown in FIG. 1, is formed as a through-going canal in the body of the hearing device 1 and provides the hearing device 1 with an acoustic path from the outside of the hearing device 1 to the part residing within the ear canal of the user during use e.g. the receiver module 2. The valve device 6 is configured to open and close the vent 8.

FIGS. 2 and 3 show that the receiver 2 module comprises a receiver housing 50. The receiver housing 50 may have a substantially cylindrical shape. FIGS. 2 and 3 show that the receiver module 2 may be connected to hearing device 1 via a receiver wire 5 at one end of the receiver housing 50. FIGS. 2 and 3 also show that the receiver module 2 may be connected to one end of a receiver sound outlet tube 53 at another end of the receiver housing 50. The other end of the receiver sound outlet tube 53 may be held in place by a vent outlet 55.

FIGS. 2 and 3 also show that the vent 4 holds the valve device 6 comprising a valve coil 51, a movable magnet 52, and a valve element 60. The magnet 52 may be a toroidal magnet and may cause the valve element 60 to move together with the magnet. A plurality of vent inlets 54 may be dispersed in the receiver housing wall between the valve coil 51 and the vent outlet 55. The vent outlet 55 may be embodied as a ring or inner bushel restricting the inner diameter of the proximal end of the receiver housing 50. A flange 56 may be arranged at one end of the receiver housing 50. The flange 56 may provide sealing between an ear plug (not shown) and the receiver housing 50 when the receiver housing 50 is mounted in the ear plug.

Still in connection with FIGS. 2 and 3, the valve device 6 is configured to move between the current position and the desired position in response to the drive signal received from the signal processor 4. The valve device 6 may be configured to move between the current e.g. open position, shown in FIG. 2, and desired e.g. closed position, shown in FIG. 3. The valve device 6 and the magnet 52 may be mounted together on the receiver sound outlet tube 53 in a way that facilitates a sliding/moving motion of the vent valve device 6 between the first, open position and the second, closed position. The signal processor 4 may first identify the current position of the valve element 60 and then determine the drive signal to be applied to the coil. The sliding/moving motion may be initiated by applying the drive signal to the valve coil 51 for creating a magnetic field attracting or repelling the magnet 52. The drive signal through the coil 51 in one direction may attract the magnet 52, thereby opening the vent, and drive signal in the opposite direction through the coil 51 may repel the magnet 52, thereby closing the vent.

FIG. 2 shows the open position of the valve element 60. In FIG. 2, the coil 51 has attracted the magnet 52 towards the distal end of the receiver housing 50. The open position, shown in FIG. 2, provides a passageway for air to flow between the plurality of vent inlets 54 and the vent outlet 55. When the ear plug and the receiver housing 50 is mounted in its intended place in the ear canal, the passageway may be the only way air can escape an ear canal, in the case that there is a sealing between the ear plug (not shown) and the receiver housing 50.

FIG. 3 shows the closed position of the valve element 60. In FIG. 3, the coil 51 has repelled the magnet 52 towards another end of the receiver housing 50. The closed position, shown in FIG. 3, provides no passageway for air to flow between the plurality of vent inlets 54 and the vent outlet 55 i.e. the passageway is closed. For instance, when the edge of the valve element 60 abuts a rim of the vent outlet 55, the valve element 60 and the vent outlet 55 forms a seal trapping the air in the ear canal from the exterior.

Figure 4:
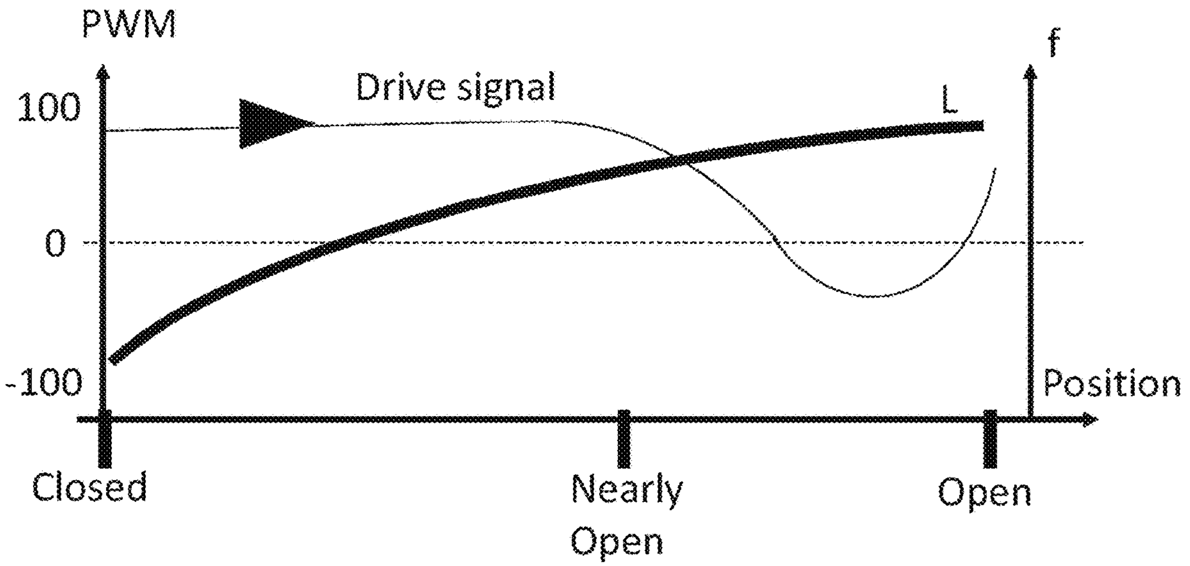
FIG. 4 illustrates a modulation of a drive signal as a valve element moves from a closed to an open position.

FIG. 4 illustrates a modulation of a drive signal as a valve element moves from a closed to an open position. The graph shows how the inductance L changes as the valve element moves from the closed to the open position. The inductance is proportional to frequency f of the LC circuit. The graph also shows PWM of the drive signal. In the illustrated scenario, the valve element is in the closed position. When in the closed position the inductance L is at its minimum as the magnet is far from the coil. As the valve element, and thereby the magnet approaches the open position, the distance between the coil and the magnet is reduced and the inductance is increased. The signal processor may determine the position of the valve element at any time from the measured resonant frequency, i.e. inductance L. Initially, the drive signal applied to the coil to move the valve between the two end points will be set to a calculated maximum. As the valve approaches the desired position, the drive signal will be modulated. When the valve element is close to the open position, e.g. when it passes 60%, or 70%, or 80%, or 90% of the distance between the two points, the drive signal is modulated. FIG. 4 shows that the drive signal is phase modulated such that it is at one point reversed below zero to ensure noiseless opening of the vent. Once the valve element is at the desired position, in this case at the open position, the PWM is increased again to ensure a full opening of the vent.

Figure 5:
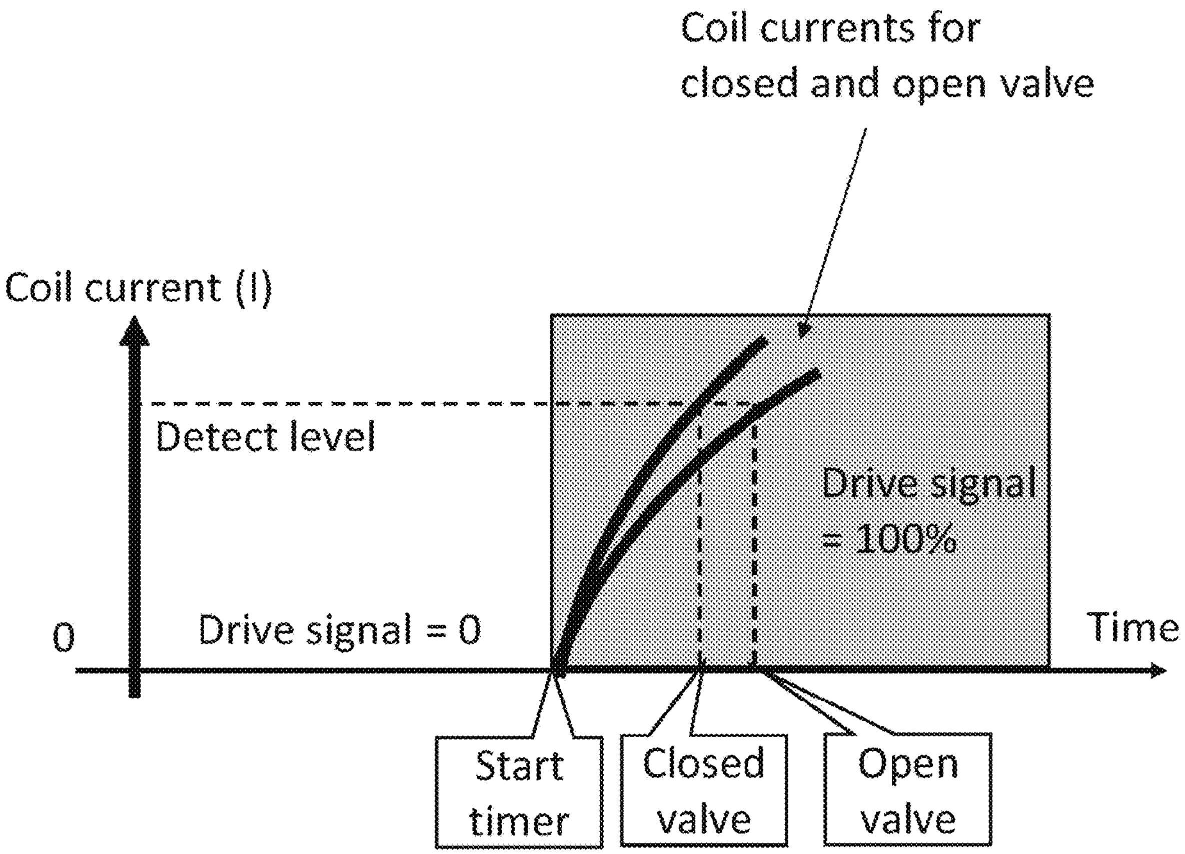
FIG. 5 illustrates position determination based on current measurements.

FIG. 5 illustrates position determination based on current measurements. The graph shows a scenario when 50% PWM is applied to the drive signal. The signal processor is configured to determine the position of the valve element in the vent by measuring a change of a current in the coil. The signal processor may start a timer when the drive signal is initiated. The drive signal may be modulated by PWM. When the current in the coil is exceeding a threshold, the timer is stopped. The time for a closed and open valve may be different because the inductance of the coil is different depending on the position of the magnet. The position is then determined from the current difference at the two recorded times and the time span during the change occurred. The time span may not be a linear function of the position. The current draw may also depend on the actual speed of the valve, and the voltage generated across the coil in the valve. It may be needed to measure the generated voltage and derive the expected result on the values and timing of the measured current if a reading of position is needed while the magnet is moving.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

1 Hearing device
2 Receiver module
4 Signal processor
6 Valve device
8 Vent
10 Output transducer
12 Drive signal
50 Receiver housing
51 Valve coil
52 Movable magnet
53 Receiver sound outlet tube
54 Vent inlet
55 Vent outlet
56 Flange
60 Valve element Items 1. A hearing device comprising a receiver module for insertion into an ear canal of a user of the hearing device, the receiver module comprising a signal processor, an output transducer, and a vent having a valve device,
the valve device comprising at least one stationary valve coil, a movable magnet, and a movable valve element, the valve element being configured to open and close the vent,
wherein the signal processor is configured to determine a current position of the valve element in the vent, and
wherein the signal processor is configured to apply a drive signal to the valve coil to thereby move the valve element from the current position to a desired position.
2. A hearing device according to item 1, wherein the drive signal is an electric current or voltage.
3. A hearing device according to any of the preceding items, wherein the signal processor is configured to determine an inductance of the valve coil to thereby derive the position of the valve element in the vent.
4. A hearing device according to any of the preceding items, wherein the signal processor is configured to determine a valve element speed while the valve element is moving in the vent.
5. A hearing device according to any of the preceding items, wherein the signal processor is configured to change a valve element speed by applying a modulation on the drive signal applied to the valve coil.
6. A hearing device according to item 5, wherein the applied modulation is a pulse width modulation, or amplitude modulation, or on-off keying modulation.
7. A hearing device according to any of the preceding items, wherein the signal processor is configured to change a valve element speed when the valve element is close to the desired position.
8. A hearing device according to items 4-7, wherein the signal processor is configured to determine a voltage generated by the movable magnet relative to the valve coil to thereby determine the valve element speed.
9. A hearing device according to any of the preceding items, wherein the signal processor is configured to determine a minimum drive signal required to move the valve element from the current position to the desired position.
10. A hearing device according to any of the preceding items, wherein the drive signal is based on the determined current position of the valve element in the vent.
11. The hearing device according to any of the preceding items, wherein at least one of the one or more input transducers is arranged in the hearing device.
12. The hearing device according to any of the preceding items, wherein at least one of the one or more input transducers is arranged in the receiver module of the hearing device.
13. The hearing device according to any of the preceding items, wherein the hearing device further comprises a wireless communication unit and an antenna.
14. The hearing device according to any of the preceding items, wherein the one or more input transducers comprises a microphone or an array of microphones.
15. The hearing device according to any of the preceding items, wherein the signal processor is configured to electrically drive the valve coil at scheduled times.
16. A method for controlling a valve device of a hearing device, the hearing device comprising a receiver module for insertion into an ear canal of a hearing device user, the receiver module comprising a signal processor, an output transducer, a vent having the valve device,
the valve device comprising at least one stationary valve coil, a movable magnet, and a movable valve element, the valve element being configured to open and close the vent,
the method comprising:
determining, by the signal processor, a current position of the valve element in the vent, applying, by the signal processor, a drive signal to the valve coil to thereby move the valve element from the current position to a desired position.

17. A method according to item 16, further comprising modulating the drive signal to thereby change a valve element speed before it reaches an end position, the end position being an open position or a closed position.

18. A method according to items 16 or 17, further comprising determining the position of the valve element at least one more time before the valve element reaches the desired position.

19. A binaural system comprising a first hearing device and a second hearing device according to any of the preceding items.

The invention claimed is:

1. A hearing device comprising:

a receiver module for insertion into an ear canal of a user of the hearing device, the receiver module comprising a signal processor, an output transducer, and a vent having a valve device;

wherein the valve device comprises a stationary valve coil, a movable magnet, and a movable valve element, the valve element being configured to open and close the vent, wherein the vent is open when the valve element is at a first position, and is closed when the valve element is at a second position;

wherein the signal processor is configured to determine an inductance of the valve coil to determine a position of the valve element; and wherein the signal processor is configured to apply a drive signal to the valve coil to move the valve element.

2. A hearing device comprising:

a receiver module for insertion into an ear canal of a user of the hearing device, the receiver module comprising a signal processor, an output transducer, and a vent having a valve device;

wherein the valve device comprises a stationary valve coil, a movable magnet, and a movable valve element, the valve element being configured to open and close the vent;

wherein the signal processor is configured to determine a current position of the valve element;

wherein the signal processor is configured to apply a drive signal to the valve coil to move the valve element from the current position to a desired position; and wherein the signal processor is configured to determine a speed of the valve element while the valve element is moving relative to the vent.

3. The hearing device according to claim 2, wherein the drive signal is an electric current or voltage.

4. The hearing device according to claim 2, wherein the signal processor is configured to change a speed of the valve element by applying a modulation on the drive signal applied to the valve coil.

5. The hearing device according to claim 4, wherein the applied modulation is a pulse width modulation, or an amplitude modulation, or an on-off keying modulation.

6. The hearing device according to claim 2, wherein the signal processor is configured to change a speed of the valve element when the valve element is close to the desired position.

7. The hearing device according to claim 2, wherein the signal processor is configured to determine a minimum drive signal required to move the valve element from the current position to the desired position.

8. The hearing device according to claim 2, wherein the drive signal is based on the determined current position of the valve element.

9. The hearing device according to claim 2, further comprising a tube having an outlet configured to output sound, wherein the moveable valve element is circumferentially disposed around the tube.

10. The hearing device according to claim 9, wherein the vent is located radially away from the tube, and the moveable valve element is radially between the tube and the vent.

11. The hearing device according to claim 2, wherein the second position is proximal to the first position, and wherein when the valve element is at the first position, the vent is opened, and wherein when the valve element is at the second position proximal to the first position, the vent is closed.

12. A hearing device comprising:

a receiver module for insertion into an ear canal of a user of the hearing device, the receiver module comprising a signal processor, an output transducer, and a vent having a valve device;

wherein the valve device comprises a stationary valve coil, a movable magnet, and a movable valve element, the valve element being configured to open and close the vent, wherein the vent is open when the valve element is at a first position, and is closed when the valve element is at a second position;

wherein the signal processor is configured to apply a drive signal to the valve coil to move the valve element; and wherein the signal processor is configured to determine a voltage generated by the movable magnet moving relative to the valve coil to determine a speed of the valve element.

13. A hearing device comprising:

a receiver module for insertion into an ear canal of a user of the hearing device, the receiver module comprising a signal processor, an output transducer, and a vent having a valve device;

wherein the valve device comprises a stationary valve coil, a movable magnet, and a movable valve element, the valve element being configured to open and close the vent, wherein the vent is open when the valve element is at a first position, and is closed when the valve element is at a second position;

wherein the signal processor is configured to apply a drive signal to the valve coil to move the valve element; and wherein at least a part of the drive signal is determined while the valve element is moving between the first position and the second position.

14. A method for controlling a valve device of a hearing device, the hearing device comprising a receiver module for insertion into an ear canal of a hearing device user, the receiver module comprising a signal processor, an output transducer, a vent, and the valve device, the valve device comprising a stationary valve coil, a movable magnet, and a movable valve element, the valve element being configured to open and close the vent, wherein the vent is open when the valve element is at a first position, and is closed when the valve element is at a second position, the method comprising applying, by the signal processor, a drive signal to the valve coil to move the valve element, wherein at least a part of the drive signal is determined while the valve element is moving between the first position and the second position.

15. The method according to claim 14, further comprising modulating the drive signal to change a speed of the valve element before the valve element reaches an end position, the end position being the first position or the second position.

* * * * *